Patented Sept. 30, 1952

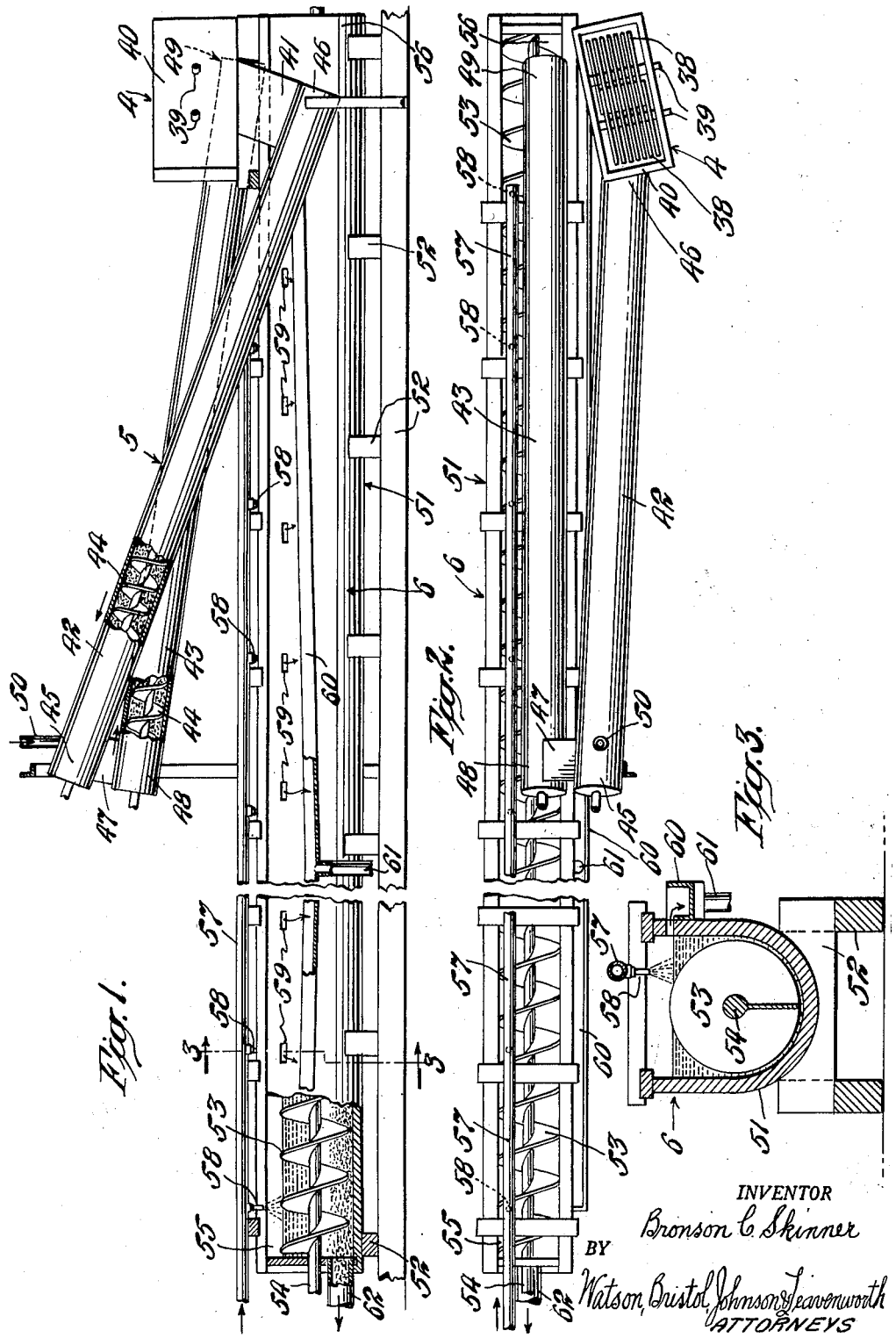

2,612,178

UNITED STATES PATENT OFFICE 2,612,178

APPARATUS FOR WASHING DISCRETE UNITS OF SOLID MATERIALS

Bronson C. Skinner, Dunedin, Fla., assignor to Clinton Foods Inc., New York, N. Y., a corporation of Delaware Application January 7, 1948, Serial No. 1,045

1 Claim. (Cl. 134—132)

The present invention relates to apparatus for washing moving masses of solid materials in the form of discrete units and, more particularly, to washing citrus fruit peel pieces from which a pectin product may be subsequently extracted; and the present application discloses apparatus useful in practicing the process claimed in copending application Serial No. 499,088, filed August 18, 1943, issued as Patent No. 2,455,382.

A general object of the present invention is to provide a simple and economically constructed and operated apparatus which will thoroughly wash such solid materials in washing liquid of less specific gravity and will permit efficient separation of lighter foreign particles mixed with discrete units of the solid materials, and which is adapted to perform those functions during continuous movement or flow of the discrete units.

A more specific object of the invention is the provision of such apparatus which may be employed to advantage in a continuous flow procedure of producing a pectin product from citrus fruit peel pieces with efficient washing of the latter while effectively separating therefrom particles of rag and pulp.

An additional object of the invention is the provision of such apparatus which will efficiently perform a washing procedure characterized by movement of peel pieces through flowing wash water with turbulence to carry off by flotation particles of rag and pulp and to dissolve out and remove from the peel at least certain proportions of sugars and mineral matters and other extraneous substances, such as effective elimination of the bitter principle of grapefruit peel.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claim.

For a fuller understanding of the nature and objects of the invention, reference should be had to the following detailed description taken in connection with the accompanying drawing, in which:

Fig. 1 is a side elevational view, with parts broken away and in section, of washer apparatus of the present invention, and showing certain other apparatus associated therewith;

Fig. 2 is a top plan view of the structure shown in Fig. 1; and

Fig. 3 is an elevational section taken substantially on line 3—3 of Fig. 1, with parts broken away.

The present invention in its broader aspects is an apparatus for washing discrete units of solid materials which, in a particular procedure for producing a pectin product, may be in the form of pieces or shreds of citrus fruit peel. Briefly it comprises a trough having a conveyor extending longitudinally thereof and disposed in the bottom continuously to move the discrete units therethrough. A washing liquid supply is provided continuously to maintain in the trough a bath of the liquid of a specific gravity less than that of the material so that the latter sinks therein to be moved therethrough by the conveyor. The trough additionally has one or more spill ways, preferably on at least one side thereof, to determine the level of the bath of washing liquid and also to serve as an outlet for floated foreign particles lighter than the liquid which may be mixed with the discrete units to be washed. Means are provided to turbinate or agitate the bath and such means may comprise the conveyor and spraying devices to supply the washing liquid.

The drawing illustrates one embodiment of the invention adapted for use in a procedure for making a pectin product from citrus fruit peel and the illustrated parts are identified by similar numerals throughout. As therein shown the feed to the washing apparatus of the present invention may comprise a shredder 4 and a steamer 5 with the latter intended to preheat and water-log citrus fruit peel shreds, as well as loosen unwanted soluble materials trapped in the cellular structure of the peel, and the construction and operations thereof are more fully explained in the above identified patent. The steamer 5 has a discharge end 49 which is located above the receiving end of washing apparatus 6 of the present invention, as shown in Figs. 1 and 2. That washing apparatus 6 comprises an elongated trough 51, preferably constructed of wood, mounted substantially horizontally upon suitable supports 52—52. A typical embodiment of this apparatus may be about sixty-five feet (65') long having a conveyor screw 53 therein adapted to be rotated at a relatively slow speed, such as about two revolutions per minute (2 R. P. M.), by its shaft 54. The screw 53 may extend from the discharge end 55 of the trough 51 to the receiving end 56 thereof, as shown. This screw 53 may be about two feet (2') in diameter and have a lead of about two feet (2'), so as to move the peel shreds from the receiving end 56 slowly through the wash water to the discharge end 55 for a relatively long period, for example, about one-half hour (½ hr.). Water may be supplied to the trough 51 by means of an overhead pipe 57 which may be fitted with a plurality of nozzles 58—58 to spray the water down into the trough, and the rough is preferably provided along at least one side thereof with a plurality of overflow slots 59—59 which are adapted to spill water into a trough 60 connected to a discharge conduit 61.

In one typical operation of the washing apparatus 6, steam-treated water-logged peel shreds are dumped from the discharge end 49 of the steamer 5 into the receiving end 56 of the washer 6. They sink to the bottom of the trough 51 and are slowly moved along to the discharge end 55 by the screw conveyor 53 to a discharge pipe 62 where they are drawn off with water, such as by means of a centrifugal pump (not shown). The slowly rotating screw conveyor 53 may create some turbulence in the water bath as do the overhead sprays of water from the nozzles 58—58. Additional or other turbulence may be created in the water bath by submerged air jets and with the provision of the latter, means other than spray nozzles 58—58 may be employed to supply water to the trough 51, or both types of jets may be used if desired. Treatment of the peel shreds in the water bath results in extraction of non-pectin material. A proportion of the sugars and mineral matters are removed thereby and other extraneous material such as the bitter principle of grapefruit peel may be eliminated from the peel shreds by the wash water. Particles of rag and pulp freed from the peel shreds will float in the water bath and thus by flotation will be removed with the water overflowing through slots 59—59 to the trough 60. Peel shreds which are removed through the discharge pipe 62 thus have their sugar and mineral matters content reduced below a certain critical maximum so that a liquor extracted therefrom in a cooker may be spray dried to provide a satisfactory product ready for use. It is preferred to use water in the washer 6 at a temperature of about twenty-five degrees centigrade (25° C.), in connection with that particular procedure.

Of course, as intimated above, the apparatus of the present invention may be employed to advantage in the washing of a variety of types of discrete units of solid materials with any suitable washing liquid having a less specific gravity. The apparatus will effectively separate from the mass of discrete units by flotation any foreign particles lighter than the washing liquid which may be mixed in with the discrete units to be washed.

It will thus be seen that the objects set forth above and those made apparent from the preceding description are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

Apparatus for washing discrete units of solid materials comprising an elongated trough of U-cross section, a conveyor screw in said trough substantially fully occupying the bottom portion thereof, said conveyor screw being mounted for rotation, spaced spray nozzles mounted along the trough for discharge of water thereinto, an overflow channel along one side of said trough determining the water level of said trough and adapted to receive overflow water and floating debris, and a discharge opening at one end of said trough reaching to the bottom thereof adapted to discharge water and washed solid materials heavier than water moved along by said conveyor screw, said other end of the trough being adapted to receive discrete units of solid materials heavier than water for movement along the trough by said conveyor screw, said conveyor screw and water sprays being adapted to effect a washing turbulence in the trough so that material placed in the trough is washed thereby as it is moved along to said discharge opening by said conveyor screw and floatable debris overflows into said overflow channel.

BRONSON C. SKINNER.

REFERENCES CITED

The following references are of record in the file of this patent:

UNITED STATES PATENTS

| Number | Name | Date |
|---|---|---|
| 1,056,952 | Smith | Mar. 25, 1913 |
| 1,294,519 | Moxham | Feb. 18, 1919 |
| 1,374,341 | Vaudreuil | Apr. 12, 1921 |
| 1,479,218 | Brady | Jan. 1, 1924 |
| 1,716,228 | Horne | June 4, 1929 |
| 2,353,602 | Trotter | July 11, 1944 |
| 2,432,756 | Hapman | Dec. 16, 1947 |
| 2,455,382 | Nelson | Dec. 7, 1948 |